United States Patent
Chen et al.

(10) Patent No.: US 11,287,873 B2
(45) Date of Patent: Mar. 29, 2022

(54) SENSING DEVICE AND CONTROL METHOD

(71) Applicant: AU Optronics Corporation, Hsin-Chu (TW)

(72) Inventors: Tsung-Ta Chen, Hsin-Chu (TW); Chien-Li Cheng, Hsin-Chu (TW); Tien-Yu Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 53 days.

(21) Appl. No.: 16/645,275

(22) PCT Filed: Sep. 26, 2017

(86) PCT No.: PCT/CN2017/103452
§ 371 (c)(1),
(2) Date: Mar. 6, 2020

(87) PCT Pub. No.: WO2019/056399
PCT Pub. Date: Mar. 28, 2019

(65) Prior Publication Data
US 2020/0285302 A1 Sep. 10, 2020

(30) Foreign Application Priority Data
Sep. 20, 2017 (CN) .......................... 201710852936.0

(51) Int. Cl.
*G06F 1/26* (2006.01)
*G06F 1/32* (2019.01)
(Continued)

(52) U.S. Cl.
CPC .............. *G06F 1/3296* (2013.01); *G06F 1/28* (2013.01); *G06F 1/3228* (2013.01); *G06F 3/017* (2013.01)

(58) Field of Classification Search
CPC ..................................................... G06F 1/3296
See application file for complete search history.

(56) References Cited

U.S. PATENT DOCUMENTS

| 11,000,229 B2* | 5/2021 | Leavitt ................ A61B 5/4528 |
| 2011/0128898 A1* | 6/2011 | Park ................. H04W 72/1263 370/311 |

(Continued)

FOREIGN PATENT DOCUMENTS

| CN | 103179650 A | 6/2013 |
| CN | 103235673 A | 8/2013 |

(Continued)

*Primary Examiner* — Mohammed H Rehman
(74) *Attorney, Agent, or Firm* — WPAT, PC

(57) ABSTRACT

A sensing device includes a power supply, a sensing element, a communication element, a controller and a microprocessor. The controller is configured to control the sensing element and the communication element. The microprocessor is configured to be activated from the sleep state periodically according to a time period. The microprocessor is configured to control the power supply to supply power to the controller, the sensing element and the communication element, such that the sensing element senses the environment to acquire a plurality of sensing values. After the communication element transmits the sensing values to a server, the microprocessor controls the power supply to stop supplying power to the controller, the sensing element and the communication element, and also the microprocessor enters the sleep state.

11 Claims, 6 Drawing Sheets

(51) Int. Cl.
*G06F 1/3296* (2019.01)
*G06F 1/28* (2006.01)
*G06F 1/3228* (2019.01)
*G06F 3/01* (2006.01)

(56) References Cited

U.S. PATENT DOCUMENTS

| | | |
|---|---|---|
| 2014/0075226 A1 | 3/2014 | Heo et al. |
| 2014/0207375 A1* | 7/2014 | Lerenc .................. H04W 4/029 |
| | | 701/527 |
| 2014/0331073 A1 | 11/2014 | Feng et al. |
| 2015/0253364 A1 | 9/2015 | Hieda et al. |
| 2015/0323984 A1* | 11/2015 | Ganton ..................... G06F 1/28 |
| | | 713/323 |
| 2016/0062464 A1 | 3/2016 | Moussette et al. |
| 2016/0062465 A1 | 3/2016 | Moussette et al. |
| 2016/0062466 A1 | 3/2016 | Moussette et al. |
| 2016/0063825 A1 | 3/2016 | Moussette et al. |
| 2016/0063827 A1 | 3/2016 | Moussette et al. |
| 2016/0063828 A1 | 3/2016 | Moussette et al. |
| 2016/0366644 A1* | 12/2016 | Ghosh ..................... H04W 4/70 |
| 2017/0181091 A1* | 6/2017 | Cao .................. H04W 52/0229 |
| 2018/0082552 A1 | 3/2018 | Moussette et al. |
| 2018/0246516 A1* | 8/2018 | Franzius ................ G01C 21/20 |
| 2019/0011965 A1* | 1/2019 | Seyed .................... G06F 1/206 |
| 2019/0142206 A1* | 5/2019 | Yan ....................... A47J 43/046 |
| | | 219/505 |
| 2019/0248193 A1* | 8/2019 | Scheibenzuber ... B60C 23/0442 |
| 2020/0098250 A1* | 3/2020 | Satou .................... G08B 29/188 |

FOREIGN PATENT DOCUMENTS

| | | |
|---|---|---|
| CN | 106295487 A | 1/2017 |
| TW | M426769 U | 4/2012 |
| TW | 201533715 A | 9/2015 |
| TW | I520461 B | 2/2016 |
| TW | 201614954 A | 4/2016 |
| TW | M532663 U | 11/2016 |
| TW | 201712539 A | 4/2017 |

* cited by examiner

SENSING DEVICE AND CONTROL METHOD

CROSS-REFERENCE TO RELATED APPLICATION

This application is a continuation of International application No. PCT/CN2017/103452, filed Sep. 26, 2017 which claims the benefits of priority of CN application No. 201710852936.0 filed on Sep. 20, 2017, the content of which are incorporated herein by reference in their entireties.

BACKGROUND

Field of Invention

The present invention relates to a sensing device. More particularly, the present invention relates to a sensing device and a control method thereof.

Description of Related Art

The internet of things (IoT) system requires deploying a large number of sensing devices. The massive sensing devices form a wireless communication network, and the massive sensing devices return the measured result to a host computer and a communication equipment. However, it is required to implement wirings for suppling power to the massive sensing devices and also to maintain the massive sensing devices, such that it will induce a high initial cost for implementing those power suppling wirings and also a high maintenance cost.

Therefore, how to effectively decrease the power consumption of the sensing devices is one of the issues to be improved in this field.

SUMMARY

The disclosure provides a sensing device. The sensing device includes a power supply, a sensing element, a communication element, a controller and a microprocessor. The controller is configured to control the sensing element and the communication element. The microprocessor is configured to be activated from the sleep state periodically according to a time period. The microprocessor is configured to control the power supply to supply power to the controller, the sensing element and the communication element, such that the sensing element senses the environment to acquire a plurality of sensing values. After the communication element transmits the sensing values to a server, the microprocessor controls the power supply to stop supplying power to the controller, the sensing element and the communication element, and also the microprocessor enters the sleep state.

Another aspect of the disclosure is to provide a control method. The control method is suitable for a sensing device. The sensing device includes the power supply, the sensing element, the communication element, the controller and the microprocessor. The control method includes the following steps. The microprocessor is configured to be activated from the sleep state periodically according to a time period. The power supply supplies power to the controller, the sensing element and the communication element. The sensing element senses the environment to acquire a plurality of the sensing values. The communication element transmits the sensing values to the server. The power supply stops supplying power to the controller, the sensing element and the communication element, and the microprocessor enters the sleep state.

Therefore, based on the disclosure, some embodiments of the disclosure provide aforesaid sensing device and aforesaid control method, which are capable of activating or suspending the power supply to supply power to the controller, the communication, and the sensing element by a low power-consuming microprocessor, so as to effectively decrease the power consumption of the sensing device.

BRIEF DESCRIPTION OF THE DRAWINGS

The disclosure can be more fully understood by reading the following detailed description of the embodiment, with reference to the accompanying drawings as follows.

DETAILED DESCRIPTION

The following disclosure provides many different embodiments or illustrations to implement different features of the disclosure. The elements and configurations in the particular example are used in the following discussion to simplify the present disclosure. Any illustrations discussed are for illustrative purposes only and do not limit the scope and meaning of the invention or its illustrations. In addition, the present disclosure may refer to numerical symbols and/or letters in different examples repeatedly, and these repetitions are for simplification and explanation, and do not specify the relationship between different embodiments and/or configurations in the following discussion.

The terms used throughout the specification and the scope of patent applications, unless otherwise specified, they usually have the ordinary meaning of each term used in this field, in the content disclosed here and in special content. Certain terms used to describe this disclosure are discussed below or elsewhere in this specification to provide an additional guidance to those skilled in the art on the description of this disclosure.

In this document, the term "coupled" or "connected" can refer to two or more components direct physical or electrical contact with each other or indirect physical or electrical contact with each other, and the term "coupled" or "connected" can refer to two or more components interoperate or act with each other.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure. As used herein, the predicate "and/or" includes any combination of one or more of the associated items listed. The "and/or" mentioned in this document refers to any, all or at least one of the listed elements in any combination.

Figure 1:
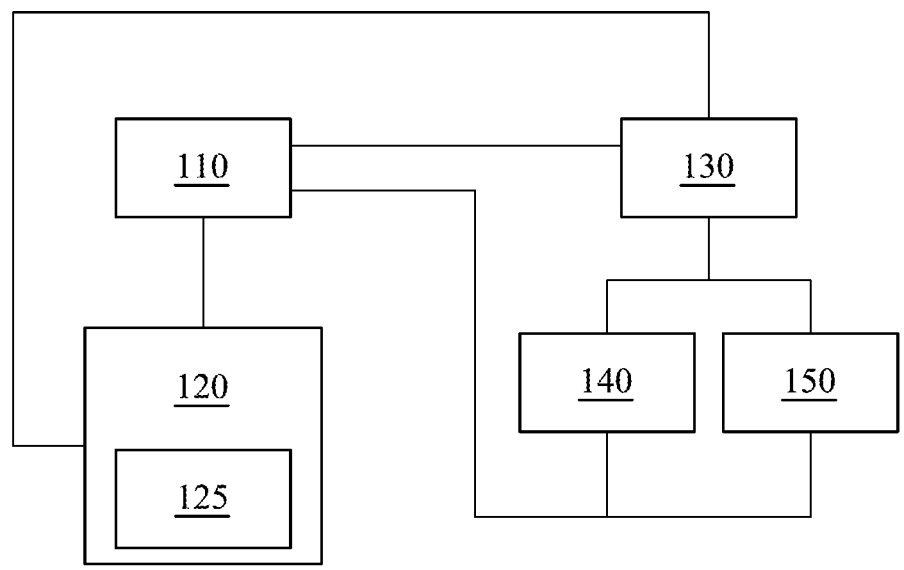
FIG. 1 is a type of the sensing device schematic diagram in accordance with some embodiments of the disclosure.

Please refer to FIG. 1. FIG. 1 is a schematic diagram illustrating a sensing device 100 in accordance with some embodiments of the disclosure. As shown in FIG. 1, the sensing device 100 includes a power supply 110, a microprocessor 120, a controller 130, a sensing element 140 and a communication element 150. The power supply 110 is electrically coupled to the microprocessor 120, the controller 130, the sensing element 140 and the communication element 150, respectively. The controller 130 is electrically coupled to the microprocessor 120, the sensing element 140 and the communication element 150, respectively. The sensing device 100 illustrated in FIG. 1 is a demonstrational example, and the disclosure is not limited thereto. In some embodiments, the sensing device 100 may include plural the sensing elements 140 and plural communication elements 150.

In some embodiments, the microprocessor 120 is configured to be activated from a sleep state periodically according to a time period, and the microprocessor 120 controls the power supply 110 to supply power to the controller 130, the sensing element 140 and the communication element 120. Afterward, the sensing element 140 senses the environment to acquire a plurality of the sensing values. The communication element 150 transmits the sensing values to the server (not shown). After the communication element 150 transmits the sensing values to the server, the microprocessor 120 controls the power supply 110 to stop supplying power to the controller 130, the sensing element 140 and the communication element 150. Afterward, the microprocessor 120 enters the sleep state. It is noticed that, before the microprocessor 120 is activated, all of the power supply 110, the controller 130, the sensing element 140 and the communication element 150 are in the sleep state.

In some embodiments, the controller 130 is further configured to determine whether the sensing values are reasonable. For example, in some embodiments, the controller 130 determines whether the sensing values are in a value range. If the controller 130 determines that the sensing values are in the value range, the controller 130 controls the communication element 150 to transmit the sensing values to the server. If the controller 130 determines that the sensing values are not in the value range, the controller 130 controls the sensing element 140 to sense the environment again, so as to acquire the sensing values again.

In some embodiments, the microprocessor 120 is further configured to determine whether the transmission of the sensing values to the server is successful or not. If the microprocessor 120 determines that the sensing values are successfully transmitted to the server, the microprocessor 120 stops supplying power to the controller 130, the sensing element 250 and the communication 150. Afterward, the microprocessor 120 enters to the sleep state. If the microprocessor 120 determines that the transmission of the sensing values to the server is failed or not completed, the microprocessor 120 transmits a signal to the controller 130, and accordingly the controller 130 controls the communication element 150 to transmit the sensing values to the server again.

In some embodiments, the microprocessor 120 further includes a timer 125. The timer 125 is configured to determine whether the time period is expired. When the timer 125 determines that the time period is expired, the microprocessor 120 is activated from the sleep state.

In some embodiments, when the microprocessor 120 is activated from the sleep state, the microprocessor 120 is further configured to determine whether a storage power of the power supply 110 is above an upper bound of the storage power or below a lower bound of the storage power. If the microprocessor 120 determines that the storage power of the power supply 110 is above the upper bound, the microprocessor 120 decreases the time period, so as to increase the frequency that the sensing device 100 returns the sensing values to the server. If the microprocessor 120 determines that the storage power of the power supply 110 is below the lower bound, the microprocessor 120 increases the time period, so as to decrease the frequency that the sensing device 100 returns the sensing values to the server. Based on aforesaid manner of dynamically adjusting the power consumption of the sensing device 100, it can avoid the power supply 110 staying activated for a long time when the storage power is at a high level, so as to prolong the battery life. In addition, the aforesaid manner can also equalize the power consumptions of multiple sensing devices 100 in the same region to the same level.

In some embodiments, the controller 130 is configured to determine whether power consumptions of the sensing element 140 and the communication element 150 exceed a power consumption threshold respectively. If the controller 130 determines that the aforesaid power consumptions exceed the power consumption threshold, the controller 130 controls the communication element 150 to transmit an abnormal signal to the server.

Figure 2:
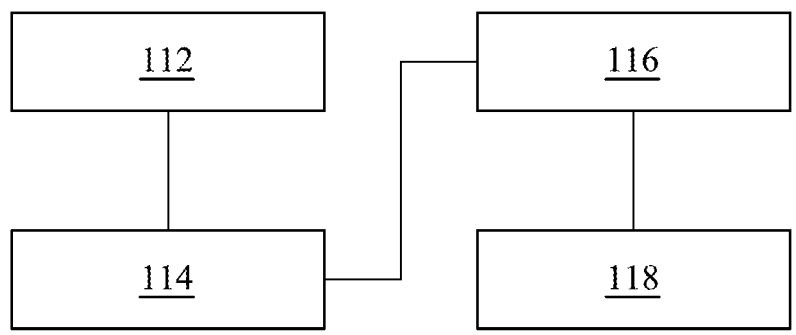
FIG. 2 is a power supply schematic diagram in accordance with some embodiments of the disclosure.

Please refer to FIG. 2. FIG. 2 is a schematic diagram illustrating the power supply 110 of the sensing device 100 in FIG. 1 in accordance with some embodiments of the disclosure. The power supply 110 includes a photovoltaic element 112, a charger integrated circuit (IC) 114, a battery 116 and a direct-current to direct-current (DC/DC) converter 118. The photovoltaic element 112 is electrically coupled to the charger IC 114. The charger IC 114 is electrically coupled to the battery 116. The battery 116 is electrically coupled to the direct-current to direct-current converter 118. The photovoltaic element 112 is configured to generate an electric power. The charger IC 114 is configured to transmit the electric power generated by the photovoltaic element 112 to the battery 116. The battery 116 is configured to store the electric power generated by the photovoltaic element 112. The DC/DC converter 118 is configured to perform a conversion of the electric power stored by the battery 116, and the DC/DC converter 118 is configured to transmit the converted electric power to the microprocessor 120, the controller 130, the sensing element 140 and the communication element 150.

In some embodiments, the microprocessor 120 is further configured to control DC/DC converter 118, such that the DC/DC converter 118 is activated to supply power to controller 130 or suspended from supplying power to controller 130, the sensing element 140 and the communication element 150.

Figure 3:
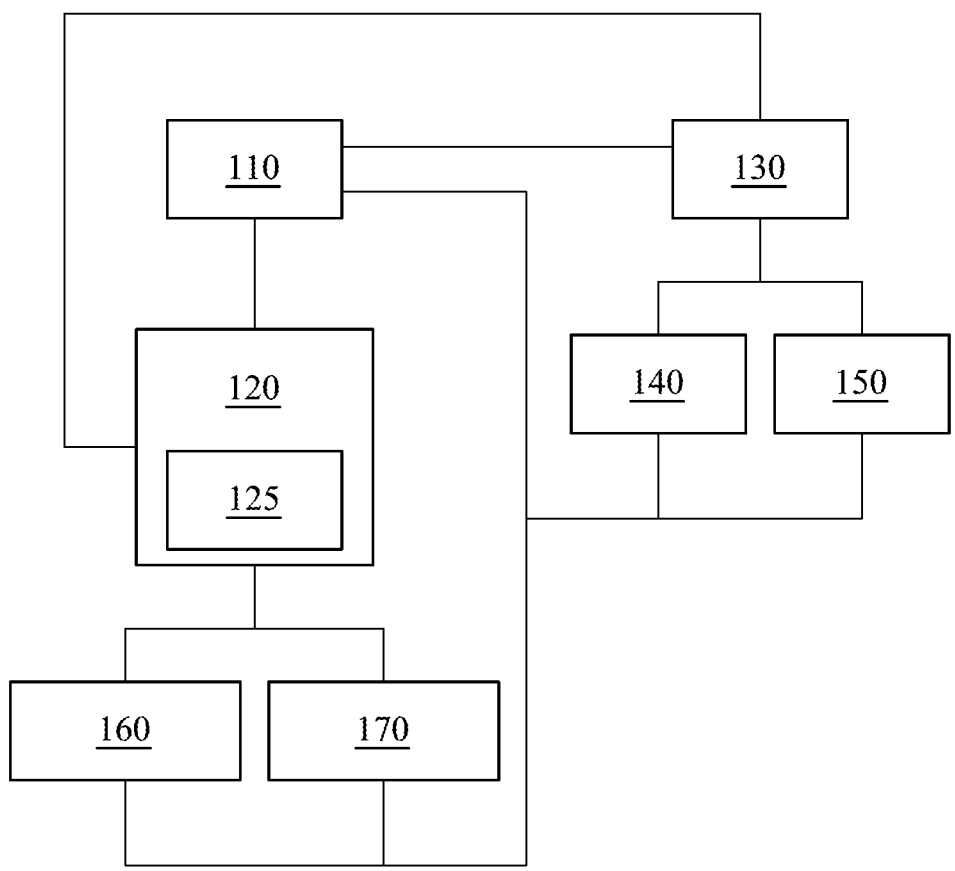
FIG. 3 is a sensing device schematic diagram in accordance with some embodiments of the disclosure.

Please refer to FIG. 3. FIG. 3 is a schematic diagram illustrating the sensing device 300 in accordance with some embodiments of the disclosure. In some embodiments, compared to the sensing device 100 as shown in FIG. 1, the sensing device 300 includes a temperature sensing element 160. In some embodiments, when the microprocessor 120 is activated from the sleep state, the microprocessor 120 controls the temperature sensing element 160 to perform a temperature measurement to the sensing device 300. When the temperature exceeds a temperature threshold, the microprocessor 120 controls the power supply 110 to supply power to the controller 130, the sensing device 140 and the communication element 150. The sensing element 140 senses the environment to acquire the sensing values. The communication element 150 transmits the sensing values to the server (not shown). After the communication element 150 transmits the sensing values to the server, the microprocessor 120 controls the power supply 110 to stop supplying power to the controller 130, the sensing element 140 and the communication element 150. In some embodiments, the microprocessor 120 then enters the sleep state.

In some embodiments, compared to the sensing device 100 as shown in FIG. 1, the sensing device 300 further includes the gravity sensing element 170. In some embodiments, when the microprocessor 120 is activated from the sleep state, the microprocessor 120 controls the gravity sensing element 170 to perform the displacement measurement to the sensing device 300. When a displacement exceeds a displacement threshold, the microprocessor 120 controls the power supply 110 to supply power to the controller 130, the sensing element 140 and the communication element 150. The sensing element 140 senses the environment, so as to acquire the sensing values. The communication element 150 transmits the sensing values to the server. After the communication element 150 transmits the sensing values to the server, the microprocessor 120 controls the power supply 110 to stop supplying power to the controller 130, the sensing element 140 and the communication element 150. In some embodiments, the microprocessor 120 then enters the sleep state.

Figure 4:
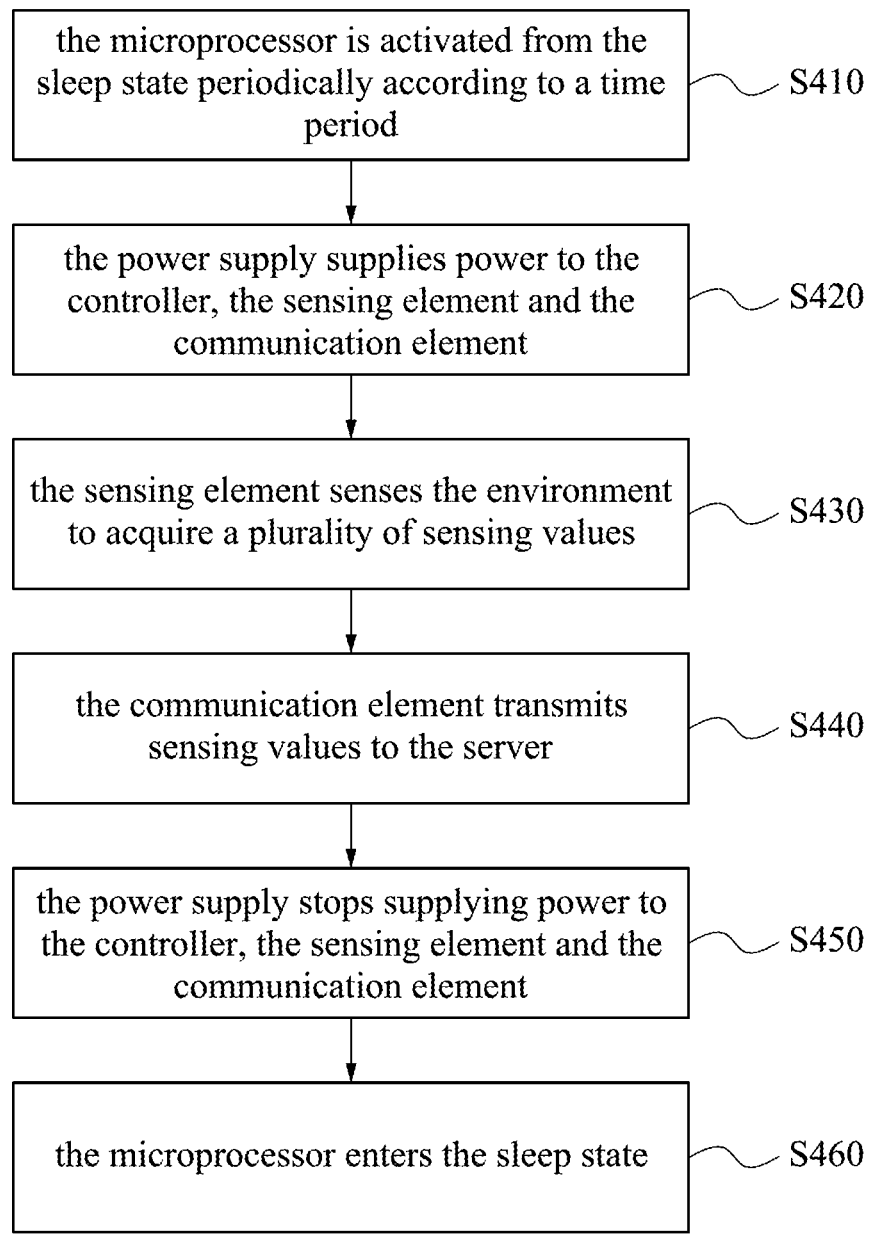
FIG. 4 is a control method flowchart in accordance with some embodiments of the disclosure.

Please refer FIG. 4. FIG. 4 is a flowchart illustrating a control method 400 in accordance with some embodiments of the disclosure. As shown in FIG. 4, the control method 400 includes steps S410-S460.

Step S410: the microprocessor is activated from the sleep state periodically according to a time period;

Step S420: the power supply supplies power to controller, the sensing element and the communication;

Step S430: the sensing element senses the environment, so as to acquire a plurality of the sensing values;

Step S440: the communication element transmits the sensing values to the server;

Step S450: the power supply stop supplying power to the controller, the sensing element and the communication element; and Step S460: the microprocessor enters the sleep state.

Reference is further made to embodiments in FIG. 1, FIG. 2 and FIG. 4 in order to understand the control method 400 better in some embodiments of the disclosure.

In step S410, the microprocessor 120 is activated from the sleep state periodically according to the time period. In some embodiments' the microprocessor 120 is further includes a timer 125. The timer 125 is configured to determine whether the time period is expired. When the timer 125 determines that the time period is expired, the microprocessor 120 is activated from the sleep state.

In step S420, the power supplies power to the controller, the sensing element and the communication. In some embodiments, the microprocessor 120 controls the power supply 110 to supply power to the controller 130, the sensing element 140 and the communication element 150. In some embodiments, the microprocessor 120 controls the DC/DC converter 118 as shown in FIG. 2, such that the power supply 110 supplies power to the controller 130, the sensing element 140 and the communication element 150.

In step S430, the sensing element senses the environment, so as to acquire a plurality of the sensing values. In some embodiments, when the power supply 110 supplies power to the sensing element 140, the sensing element 140 senses the environment to acquire a plurality of the sensing values.

In some embodiments, step S430 further includes determining whether the sensing values are reasonable. For example, the controller 130 determines whether the sensing values are in the value range. If the controller 130 determines that the sensing values are not in the value range, the sensing element 140 senses the environment again, so as to acquire a plurality of the sensing values. If the controller 130 determines that the sensing values are in the value range, and step S440 is performed.

In step S440, the communication element transmits the sensing values to the server. In some embodiments, when the power supplies 110 supply power to the communication element 150, the communication element 150 transmits the sensing values to the server.

In some embodiments, step S440 is further includes determining whether the sensing values are successfully transmitted to the server. For example, on the basis of determining whether the sensing values are successfully transmitted to the server by the microprocessor 120, if the microprocessor 120 determines the transmission of the sensing values to the server is successful, and then step S450 is performed, if the microprocessor 120 determines that the transmission of the sensing values to the server is failed or not completed, the communication element 150 transmits the sensing values to the server again.

In step S450, the power supply stops supplying power to the controller, the sensing element and the communication element. In some embodiments, after the communication element 150 transmits the sensing values to the server, the microprocessor 120 controls the power supply 110 to stop supplying power to the controller 130, the sensing element 140 and the communication element 150. In some embodiments, the microprocessor 120 controls the DC/DC converter as shown in FIG. 2, such that the power supply 110 does not supply power to the controller 130, the sensing element 140 and the communication element 150.

In step S460, the microprocessor enters the sleep state. In some embodiments, after the power supply 110 stops supplying power to the controller 130, the sensing element 140 and the communication element 150. Afterward, the microprocessor 120 enters the sleep state.

In some embodiments, when the microprocessor 120 is activated from the sleep state, the microprocessor 120 controls the power supply 110 to supply power to the controller 130 and the sensing element 140. The controller 130 controls the sensing element 140 to sense environment. After the sensing element 140 senses environment to acquire the sensing values, the sensing values are transmitted to the controller 130. The microprocessor 120 controls the power supply 110 to stop supplying power to the sensing element 140. And then, the microprocessor 120 control the power supply 110 to supply power to the communication element 150. The communication element 150 transmits the sensing values to the server. After the sensing values are successfully transmitted to the server, the microprocessor 120 controls the power supply 110 to stop supplying power to the communication element 150. Afterward, the microprocessor 120 controls the power supply 110 to stop supplying power to the controller 130.

Figure 5:
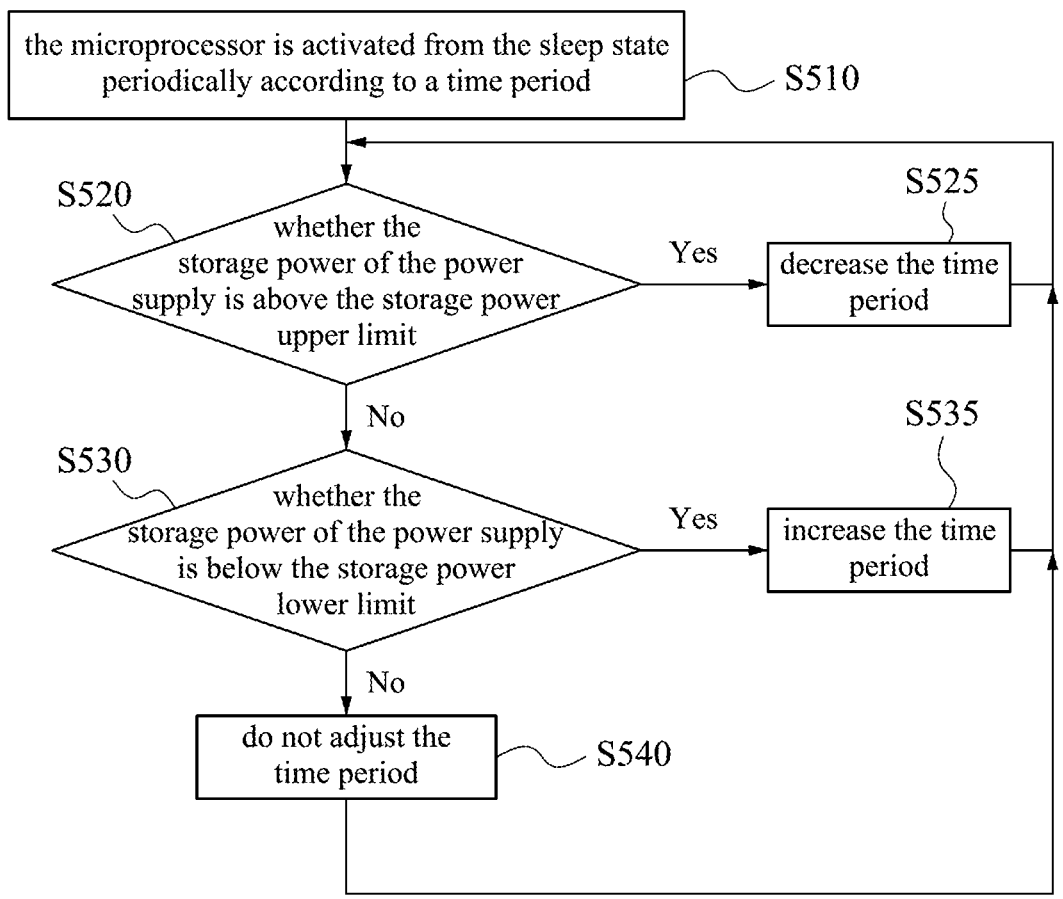
FIG. 5 is a control method flowchart in accordance with some embodiments of the disclosure.

Please refer to FIG. 5. FIG. 5 is a flowchart illustrating a control method 500 in accordance with some embodiments of the disclosure. As shown in FIG. 5, the control method 500 includes steps S510-S540.

Reference is further made to embodiments in FIG. 1, FIG. 2 and FIG. 5 in order to understand the control method 500 better in some embodiments of the disclosure.

Step S510: the microprocessor is activated from the sleep state periodically according to a period time;

Step S520: determining whether the storage power of the power supply is above the upper bound;

Step S525: decreasing the time period;

Step S530: determining whether the storage power of the power supply is below the lower bound;

Step S535: increasing the time period; and

Step S540: does not adjust the time period.

In step S510, the microprocessor is activated from the sleep state periodically according to a time period. In some embodiments' the microprocessor 120 is further includes the timer 125. The timer 125 is configured to determine whether the time period is expired. When the timer 125 determines that the time period is expired, the microprocessor 120 is activated from the sleep state.

In step S520, step S520 is to determine whether the storage power of the power supply 110 is above the upper bound. In some embodiments, step S520 is performed by the microprocessor 120. If the determined result of step S520 is that the storage power of the power supply 110 is above the upper bound, and the step S525 is performed. If the determined result of step S520 is that the storage power of the power supply 110 is not above the upper bound, and the step S530 is performed.

In step S525, step S525 is to decrease the time period. In some embodiments, the step S525 is performed by the microprocessor 120. The microprocessor 120 decreases the time period to increase the frequency that the sensing device 100 returns the sensing values to the server.

In step S530, step S530 is to determine whether the storage power of the power supply 110 is below the lower bound. In some embodiments step S530 is performed by the microprocessor 120. If the determined result of step S530 is that the storage power of the power supply 110 is below the lower bound, and the step S535 is performed. If the determined result of step S530 is that the storage power of the power supply 110 is not below the lower bound, and the step S540 is performed.

In step S535, step S535 is to increase the time period. In some embodiments, the S535 is performed by the microprocessor 120. The microprocessor 120 increases the time period, so as to decrease the frequency that the sensing device 100 returns the sensing values to the server.

In step S540, step S540 is not to adjust the time period. Because the storage power of the power supply 110 is not below the lower bound and the storage power of the power supply 110 is not above the upper bound, the microprocessor 120 does not adjust the time period.

In other embodiment, the power supply 110 includes a plurality of batteries in the sensing device 100. Based on the control method 500, when the storage power of the plurality of batteries of the power supply 110 is above the upper bound, increasing the frequency that the sensing device 100 transmits the sensing values to the server so as to increase the load power consumption, when the storage power of the plurality of batteries of the power supply 110 is below the lower bound, decreasing the frequency that the sensing device 100 returns the sensing values to the server , so as to decrease the load power consumption. Such that can equalize the lifetimes of the plurality of the batteries, so as to prolong the lifetime of the power supply 110.

Figure 6:
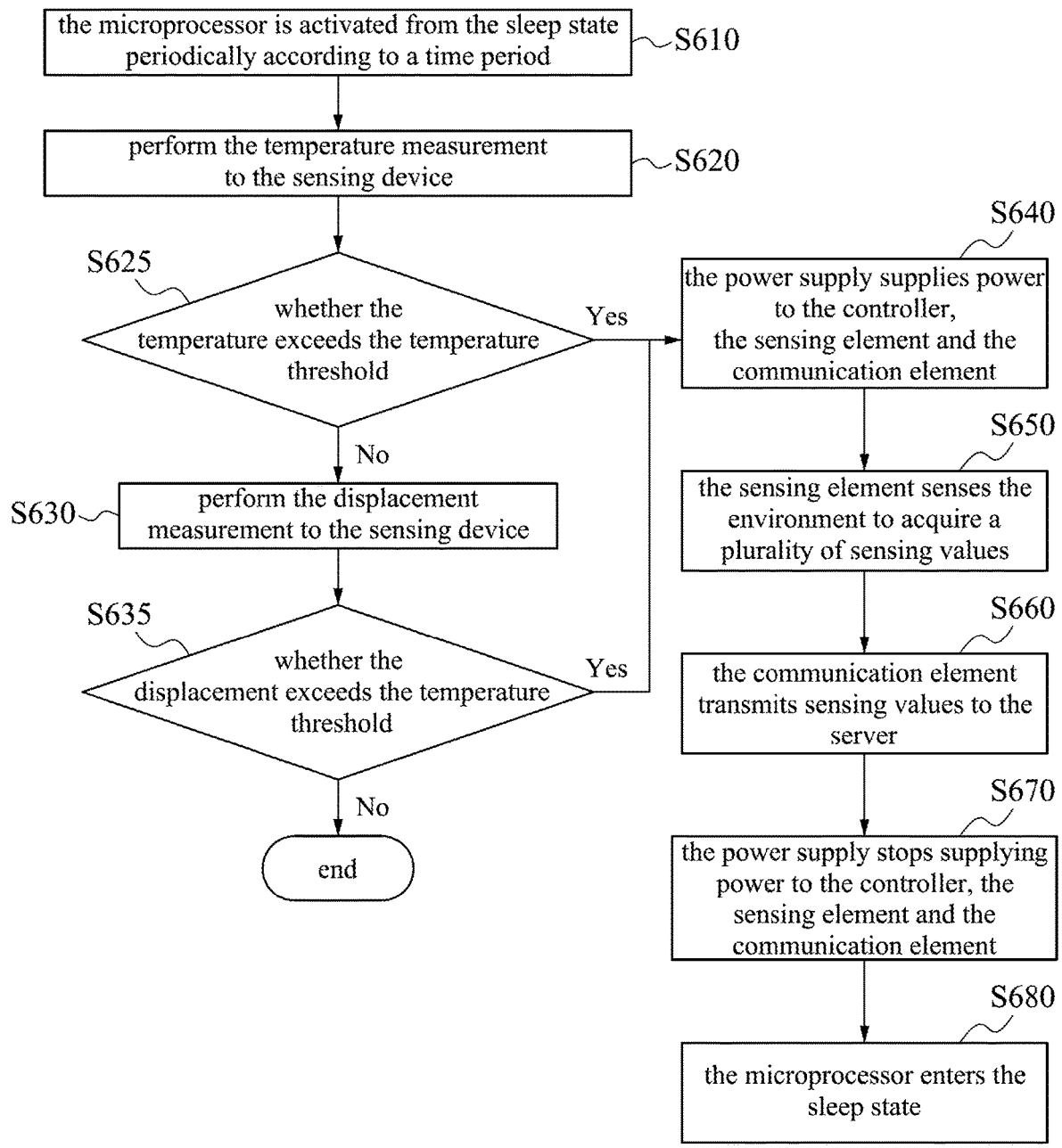
FIG. 6 is a control method flowchart in accordance with some embodiments of the disclosure.

Please refer to FIG. 6. FIG. 6 is a flowchart illustrating the control method 600 in accordance with some embodiments of the disclosure. As shown in FIG. 6, the control method 600 includes steps S610-S680.

Step S610: the microprocessor is activated from the sleep state periodically according to a time period;

Step S620: performing the temperature measurement to the sensing device;

Step S625: determining whether the temperature exceeds the temperature threshold;

Step S630: performing the displacement measurement to the sensing device;

Step S635: determining the displacement exceeds the displacement threshold;

Step S640: the power supplies power to controller, the sensing element and the communication element;

Step S650: the sensing element senses environment, so as to acquire a plurality of the sensing values;

Step S660: the communication element transmits the sensing values to the server; and Step S670: the power supply stops supplying power to the controller, the sensing element and the communication; and Step S680: the microprocessor enters the sleep state.

Reference is further made to embodiments in FIG. 1, FIG. 3 and FIG. 5 in order to understand the control method 600 better in some embodiments of the disclosure. Wherein step S610 and S640-S680 are same as step S410-S460 in FIG. 4, it will not be described in detail here.

In step S620, step S620 is to sense the temperature of the sensing device. In some embodiments, step S620 can be performed by the temperature element 160 in FIG. 3. In some embodiments, the microprocessor 120 controls the temperature element 160 to perform the temperature measurement to the sensing device 300.

In step S625, step S625 is to determine whether the temperature exceeds the temperature threshold. In some embodiments, step S625 can be performed by the microprocessor 120. If the determined result of step S625 is that the temperature exceeds the temperature threshold, and the step S640 is performed. If the determined result of step S625 is that the temperature does not exceed the temperature threshold, and the step S630 is performed.

In step S630, step S630 is to perform the displacement measurement to the sensing device. In some embodiments, step S630 can be performed by the gravity sensing element 170 in FIG. 3. In some embodiments, the microprocessor 120 controls the gravity sensing element 170 to perform the displacement measurement to the sensing device 300.

In step S635, step S635 is to determine whether the displacement exceeds the displacement threshold. In some embodiments, step S635 can be performed by the microprocessor 120 in FIG. 3. If the determined result of step S635 is that the displacement exceeds the displacement threshold, and step S640 is performed. If the determined result of step S635 is that the displacement does not exceed the displacement threshold, and the control method 600 is ended. In some embodiments, the displacement exceeds the displacement threshold may be caused by the nature disaster or the external damage.

When the sensing device 100 in the event of an emergency such as natural disaster, external damage or overheating, the control method 600 can supplies power to the controller 130, the sensing element 140 and the communication element 150, in order to perform the transmission of the last values, and the safety of the sensing device 100, 300 is ensured.

Figure 7:
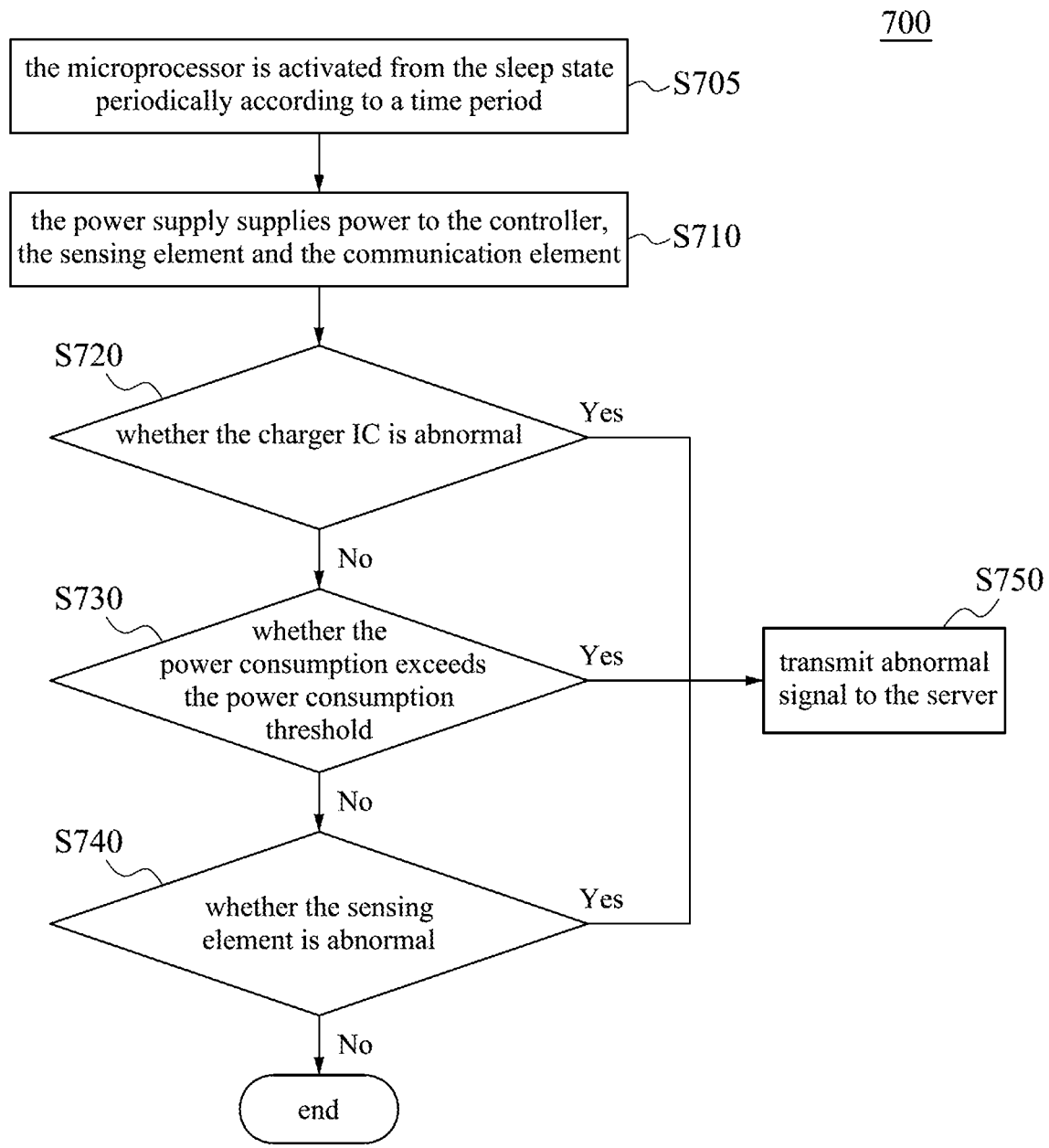
FIG. 7 is a control method flowchart in accordance with some embodiments of the disclosure.

Please refer to FIG. 7. FIG. 7 is a flowchart illustrating the control method 700 in accordance with some embodiments of the disclosure. As shown in FIG. 7, the control method 700 includes steps S705-S750.

Step S705: the microprocessor is activated from the sleep state periodically according to a time period;

Step S710: the power supply supplies power to the controller, the sensing element and the communication element;

Step S720: determining whether the charger IC is abnormal;

Step S730: determining whether the power consumption exceeds the power consumption threshold;

Step S740: determining whether the sensing element is abnormal; and

Step S750: transmitting the abnormal signal to the server.

Reference is further made to embodiment in FIG. 1, FIG. 2 and FIG. 7 in order to under the control method 700 better in some embodiments of the disclosure. Wherein step S705-S710 are same as step S410-S420 in FIG. 4, it will not be described in detail here.

In step S720, step S720 is to determine whether the charger IC is abnormal. In some embodiments, the controller 130 determines whether the charger IC 114 as shown in FIG. 2 is abnormal. If the determined result of step S720 is that the charger IC 114 is abnormal, and the step 750 is performed. If the determined result of step S730 is that the charger IC 114 is not abnormal, and the step 750 is performed.

In step S730, step S730 is to determine whether the power consumption exceeds the power consumption threshold. In some embodiments, the controller 130 determines that the respectively power consumptions of the sensing element 140 and the communication element 150 exceed the power consumption threshold. If the determined result of step S730 is that the power consumption exceeds the power consumption threshold, and the step 750 is performed. If the determined result of step S730 is that the power consumption does not exceed the power consumption threshold, and the step 740 is performed.

In step S740, step S740 is to determine whether the sensing element is abnormal. In some embodiments, the controller 130 determines whether the sensing element 140 is abnormal. If the determined result of step S740 is that the sensing element 140 is abnormal, and the step 750 is performed. If the determined result of step S740 is that the sensing element 140 is not abnormal, and the control method 700 is ended. In some embodiments, the abnormalities of the sensing element 140 includes fall out, stop updating, or unexpectedly age of the sensing element.

In step S750, step S750 is to transmit abnormal signal to the server. In some embodiments, the controller 130 controls the communication element 150 to transmit abnormal signal to the server.

In some embodiments, the power supply 110 is the circuit or element that produces, stores, and supplies power or other similar functions. In some embodiments, the microprocessor 120 is the circuit or element with functions for controlling, calculating, receiving and transmitting signals or other similar functions. In some embodiments, the controller 130 is the circuit or element with functions for controlling, calculating, receiving and transmitting signals or other similar functions. In some embodiments, the power consumption of the microprocessor 120 is less than the power consumption of the controller 130. In some embodiments' the sensing element 140 is the circuit or element with function for sensing the environment parameter such as temperature, light, displacement or other similar functions. In some embodiments, the communication element 150 can be ZigBee, Bluetooth or other circuit or element with functions for receiving and transmitting signals.

In some embodiments, the temperature element 160 is the circuit or element with function for sensing the temperature or other similar functions. In some embodiments, gravity sensing element 170 is the circuit or element with function for sensing the displacement or other similar functions. In some embodiments, the server can be the mobile phone, the host computer, the processor, etc.

In some embodiments, the photovoltaic element 112 is silicon-based solar photovoltaic elements, thin-film solar photovoltaic element or the other type of the photovoltaic element, etc. In some embodiments, the charger IC 114 is the circuit or element with functions for the electric power conversion, the electric power storage or other similar functions. In some embodiments, the battery 116 is the circuit or element with function for the electric power storage or other similar functions. In some embodiments, the DC/DC converter is the circuit or element with function for current conversion or other similar functions.

It can be known from the above embodiments, the embodiments of the disclosure provides a sensing device and a control method that the low consumption microprocessor controls the power supply to supply or does not supply power to the controller, the communication, and the sensing element in order to effectively decrease the power consumption of the sensing device. Compared with the traditional platform powered by the dry cell, the disclosure has a greater effectiveness for the sensing device, the wireless transmission manner and the frequently returned network requirements of the large power consumptions. In addition, in the disclosure, the power supply is set in the sensing device. Compared with wire electric power system, the power supply set in the sensing device has the lower deploy cost and is installed faster.

In addition, the above examples include the sequence of demonstration steps, but the steps need not be performed in the order shown. It is within the scope of this disclosure to perform these steps in different orders. Within the spirit and scope of the embodiments of the present disclosure, these steps may be added, replaced, changed, and/or omitted as appropriate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

INDUSTRIAL APPLICABILITY

The embodiments of the disclosure provide aforesaid sensing device and aforesaid control method, which are capable of activating or suspending the power supply to supply power to the controller, the communication, and the sensing element by a low power-consuming microprocessor, so as to effectively decrease the power consumption of the sensing device.

What is claimed is:

1. A sensing device, comprising:
   a power supply;
   a sensing element;
   a communication element;
   a controller configured to control the sensing element and the communication element; and
   a microprocessor configured to be activated from a sleep state periodically according to a time period, and configured to control the power supply to supply power to the controller, the sensing element and the communication element, wherein after powered up, the sensing element is configured to sense environments to acquire a plurality of sensing values, and the communication element is configured to transmit the plurality of sensing values to a server, wherein after the communication element transmits the plurality of sensing values to the server, the microprocessor is configured to control the power supply to stop supplying power to the controller, the sensing element and the communication element and configured to enter the sleep state,
   wherein the controller is further configured to determine whether the plurality of sensing values are in a value range, if the controller determines that the plurality of sensing values are in the value range, the plurality of sensing values are transmitted to the server, and if the controller determines that the plurality of sensing values are not in the value range, the sensing element senses the environments to acquire the plurality of sensing values again.

2. The sensing device of claim 1, wherein the microprocessor is further configured to determine whether the plurality of sensing values is successfully transmitted to the server.

3. The sensing device of claim 1, wherein the microprocessor further comprises:
   a timer configured to determine whether the time period is expired.

4. The sensing device of claim 1, wherein the power supply comprises:
   a photovoltaic element configured to generate an electric power;
   a battery configured to store the electric power generated by the photovoltaic element; and
   a DC/DC converter configured to transmit the electric power stored in the battery to the microprocessor, the controller, the sensing element and the communication element.

5. The sensing device of claim 1, wherein the microprocessor is further configured to determine whether a storage power of the power supply is above a upper bound of the storage power or below a lower bound of the storage power, wherein the microprocessor is further configured to reduce the time period when the storage power is above the upper bound and configured to increase the time period when the storage power is below the lower bound.

6. The sensing device of claim 1, further comprising:
   a temperature sensing element configured to sense a temperature of the sensing device;
   wherein when the temperature exceeds a temperature threshold, the microprocessor is configured to control the power supply to supply power to the controller, the sensing element and the communication element, wherein the sensing element is configured to sense environments to acquire the plurality of sensing values, wherein the microprocessor controls the power supply to stop supplying power to the controller, the sensing element and the communication element after the communication element transmits the plurality of sensing values to the server.

7. The sensing device of claim 1, further comprising:
   a gravity sensing element configured to sense a displacement of the sensing device;
   wherein when the displacement exceeds a displacement threshold, the microprocessor is configured to control the power supply to supply power to the controller, the sensing element and the communication element, wherein the sensing element is configured to sense environments to acquire the plurality of sensing values, wherein after the communication element transmits the plurality of sensing values to the server the microprocessor is configured to control the power supply to stop supplying power to the controller, the sensing element and the communication element.

8. The sensing device of claim 1, wherein the controller is configured to determine whether respective power consumptions of the sensing element and the communication element exceed a power consumption threshold.

9. A control method suitable for a sensing device, wherein the sensing device comprises a power supply, a sensing element, a communication element, a controller, a microprocessor, wherein the control method comprises:
   the microprocessor is activated from a sleep state periodically according to a time period;
   the power supply supplies power to the controller, the sensing element and the communication element;
   the sensing element senses environments to acquire a plurality of sensing values after powered up;
   the communication element transmits the plurality of sensing values to a server after powered up;
   the power supply stops supplying power to the controller, the sensing element and the communication element after the communication element transmits the plurality of sensing values to the server; and
   the microprocessor enters the sleep state,
   wherein the controller is further configured to determine whether the plurality of sensing values are in a value range, if the controller determines that the plurality of sensing values are in the value range, the plurality of sensing values are transmitted to the server, and if the controller determines that the plurality of sensing values are not in the value range, the sensing element senses the environments to acquire the plurality of sensing values again.

10. The control method of claim 9, further comprising:
    determining whether a storage power of the power supply is above a upper bound of the storage power or below a lower bound of the storage power; and
    when the storage power is above the upper bound, reducing the time period, when the storage power is below the lower bound, increasing the time period.

11. The control method of claim 9, further comprising:
    sensing a temperature of the sensing device;
    when the temperature exceeds a temperature threshold, the power supply supplies power to the controller, the sensing element and the communication element;
    the sensing element senses environments to acquire the plurality of sensing values;
    the communication element transmits the plurality of sensing values to the server; and
    the power supply stops supplying power to the controller, the sensing element and the communication element.

* * * * *